Patented Apr. 8, 1930

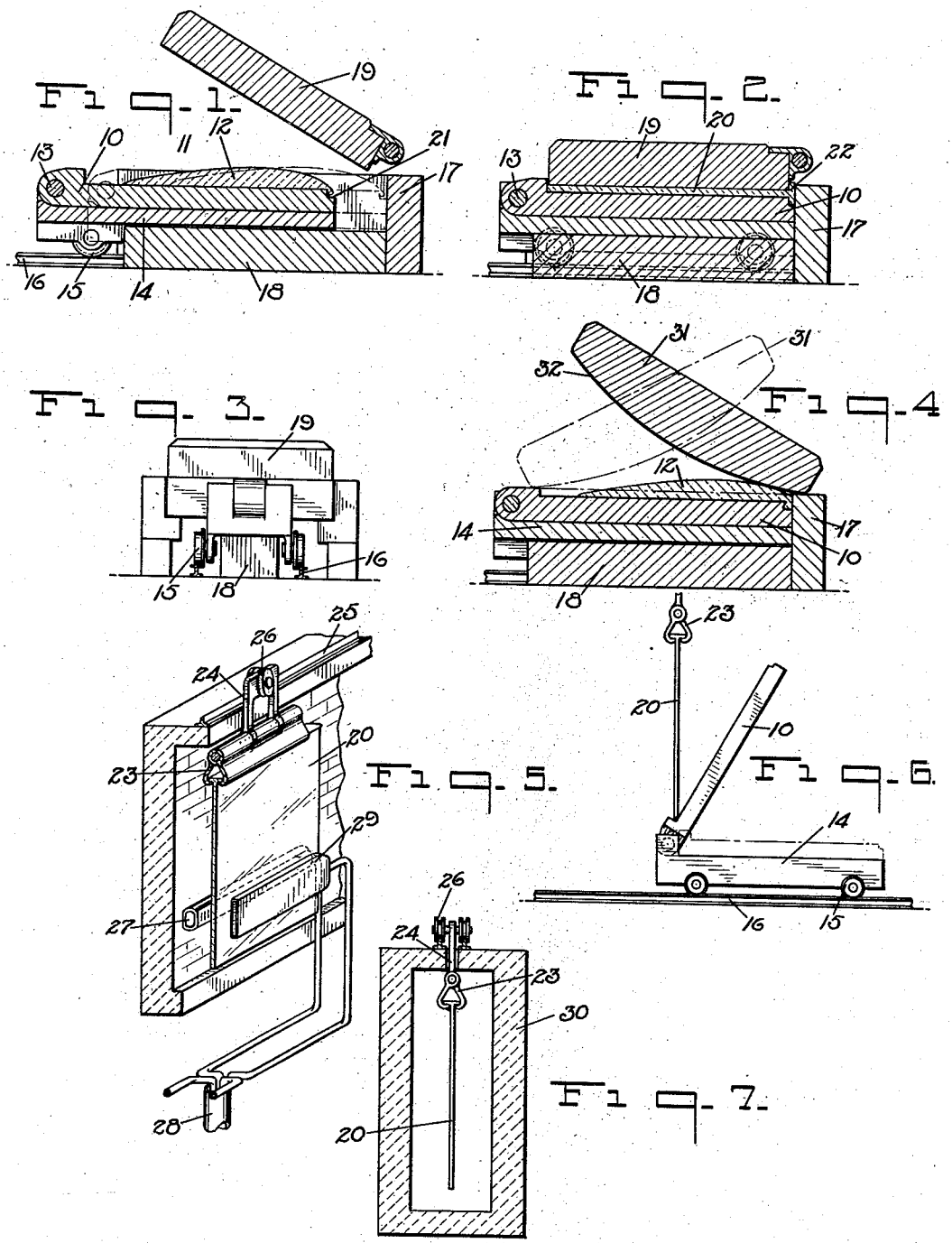

1,753,779

UNITED STATES PATENT OFFICE

ENOCH T. FERNGREN, OF TOLEDO, OHIO, ASSIGNOR TO LIBBEY-OWENS GLASS COMPANY, OF TOLEDO, OHIO, A CORPORATION OF OHIO

METHOD FOR PRODUCING SHEET GLASS

Application filed November 1, 1924. Serial No. 747,384.

This invention relates to a method and apparatus for producing sheet glass, and has particular reference to a sheet of glass which is formed by pressing between two members.

An important object of this invention is to produce a sheet of glass in this manner wherein a quantity of molten glass is pressed into sheet form after which it is fire-polished to make the said sheet usable for plate glass purposes.

A further object of this invention is to produce a sheet of glass in this manner wherein a quantity of molten glass is pressed into sheet form after which the sheet is alternately heated on one side and cooled on the other to give a finished sheet having a fire-polished surface which is suitable for plate glass uses.

Still another object of the invention is to produce a sheet of glass in this manner wherein a quantity of molten glass is pressed between surfaces of preferably non-corrosive alloy members to form a flat sheet which may be vertically run through a suitable chamber to fire-polish first one side and then the other to give a sheet having fire-polished surfaces.

Other objects and advantages of the invention will become apparent during the course of the following description.

In the drawings wherein like numerals are employed to designate like parts throughout the same.

Fig. 1 is a vertical longitudinal section through a portion of the sheet producing apparatus at the beginning of the operation, Fig. 2 is a similar view after the molten glass has been pressed into sheet form.

Fig. 3 is an end view in elevation of the pressing apparatus,

Fig. 4 is a vertical longitudinal section through a slightly modified form of mechanism, Fig. 5 is a fragmentary perspective view of the fire-polishing chamber, Fig. 6 is an elevation showing the removal of the sheet from its mold, and Fig. 7 is a transverse vertical section through the annealing leer.

In the drawings wherein for the purposes of illustration is shown the preferred embodiment of the invention, the numeral 10 designates a mold which is preferably formed from a non-corresive alloy such as nichrome, stellite, monel and other similar materials. The mold is provided with a highly polished face 11 and is adapted to receive a quantity of molten glass 12 which may be fed within the mold or upon the surface 11 in any manner such as by pouring, spreading or dropping. The mold is preferably carried at one end by means of the pin 13 on a truck or movable support 14 having the wheels 15 for running on rails or tracks 16. The truck 14 is adapted to be run on rails 16 and has communication with a box 17 having a platform 18 for contact with the lower face of the support 14, as is clearly shown in Fig. 3. Arranged above the box 17 is a pivoted pressure member 19 which may be operated by any means suitable to give the desired pressure to quickly flatten the fluent quantity of glass 12 into a sheet 20 as indicated in Fig. 2. The end of the mold 10 is grooved as at 21 to produce a bead or edge 22 on the pressed sheet as shown in Fig. 2. After the molten glass has been pressed into a flat sheet of plastic consistency, the presser member or plunger 19 may be removed or taken out of contact with the sheet while the mold and support 14 may be wheeled away and the sheet 20 removed therefrom as shown in Fig. 6. As is shown the mold section 10 is elevated preferably to a vertical position, so that tongs or suitable gripping means 23 may be engaged with the edge 22 on the sheet whereby the sheet may be supported in a vertical position. The tongs or gripping means 23 are suspended from a carriage 24 movable on a rail 25 through the medium of rollers 26.

After the glass has been pressed into sheet form it is run through a heated chamber in which are movable heat applying means for the purpose of fire-polishing the sheet first on one side and then on the other. Due to the fact that the sheet is freely suspended in a vertical position within a heat retaining chamber, there will be no tendency for warping or the creation of waves throughout the sheet. In other words, the natural weight of the sheet, due to its vertical suspension, will be sufficient to hold its tenacious body taut, thus making it possible to fire-polish the sheet without injuring the uniformity of thickness or flatness. As is shown in Fig. 5, the sheet 20, when in fire-polishing position within the chamber, is heated on one side at a time by means of burners 27 which may be moved up and down by an arrangement 28, whereby one entire side of the sheet may be fire-polished. To prevent breaking down of the sheet and to aid in maintaining the sheet in flat formation the side opposite to that which is being fire-polished may be prevented from heating or breaking down by the cooling means 29 which is movable by the same means 28. After one side of the sheet has been fire-polished it may be moved along to the next pair of heating and cooling means so that the opposite side may be fire-polished.

In this manner one side of the as yet pliant sheet can be fire-polished while the other side is maintained in a condition to prevent the sheet from thinning out due to the heat applied during the fire-polishing operation. It is to be borne in mind that the fire-polishing is accomplished by the high heat efficiency of an intense flame which is moved fairly rapidly across the surface of the sheet, thus removing any surface irregularities which may be present after the pressing operation.

After the sheet has passed through the fire-polishing chamber it is run through an annealing chamber 30 for the purpose of gradually cooling.

Referring again to the pressing operation, the flat presser member 19 shown in Figs. 1 and 2 may be substituted for by a block 31 having the curved smooth polished face 32 which may be rocked upon the mass of molten glass 12 in a manner to produce the flat sheet 20 as in the first instance, except that the glass will be more progressively flattened out from one end of the mold to the other. In this manner it will not be necessary to exert as much pressure as in the first instance, nor will there be any possibility for air pockets or the like becoming trapped during the pressing operation.

By forming a sheet of glass in accordance with the means above described, it is possible to produce sheets of plate glass more quickly and economically than has been possible in the past due to the fact that the expensive and laborious grinding and polishing operations have been entirely obviated and substituted for by a simple and quick fire-polishing process. The reason that the fire-polishing is sufficient to produce the desired type of plate glass is that the surface formed on the glass sheet 20 in the mold needs only a slight polishing which can be accomplished by the fire-polishing to give the desired finished effect. The blank form made in the mold is not to be compared in any way with the blanks heretofore used in the manufacture of plate glass, as the blank formed in the present invention is perfectly flat and smooth which is not true of the old prior art blanks used for plate glass purposes.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. The process of producing sheet glass, consisting in pressing a quantity of glass into sheet form, then placing the sheet in a vertical plane, and simultaneously moving a fire-polishing means and a cooling means in proximity thereto.

2. The process of producing sheet glass, consisting in pressing a quantity of glass into sheet form, and then simultaneously moving a fire-polishing means and a cooling means in proximity thereto.

3. The process of producing sheet glass, consisting in pressing a quantity of glass into sheet form, and then simultaneously moving a fire-polishing means and a cooling means in proximity thereto and on opposite sides of said sheet.

4. The process of producing sheet glass, consisting in pressing a quantity of glass into sheet form, placing the sheet in a vertical plane, and simultaneously moving a fire-polishing means and a cooling means in proximity thereto and on opposite sides of said sheet.

Signed at Toledo, in the county of Lucas and State of Ohio, this 30th day of October, 1924.

ENOCH T. FERNGREN.